United States Patent
Lay et al.

(10) Patent No.: US 9,566,948 B2
(45) Date of Patent: Feb. 14, 2017

(54) WIPING RUBBER FOR WIPER BLADES IN WINDSHIELD WIPERS

(75) Inventors: Reiner Lay, Aachen (DE); Valerie Carlier, Gesves (BE)

(73) Assignee: Robert Bosch GmbH, Stuttgart (DE)

( * ) Notice: Subject to any disclaimer, the term of this patent is extended or adjusted under 35 U.S.C. 154(b) by 1531 days.

(21) Appl. No.: 12/989,433

(22) PCT Filed: Apr. 1, 2009

(86) PCT No.: PCT/EP2009/053857
§ 371 (c)(1),
(2), (4) Date: Nov. 12, 2010

(87) PCT Pub. No.: WO2009/130117
PCT Pub. Date: Oct. 29, 2009

(65) Prior Publication Data
US 2011/0059301 A1 Mar. 10, 2011

(30) Foreign Application Priority Data
Apr. 25, 2008 (DE) .......... 10 2008 001 395

(51) Int. Cl.
*B32B 3/10* (2006.01)
*B60S 1/38* (2006.01)

(52) U.S. Cl.
CPC .......... *B60S 1/38* (2013.01); *B60S 2001/3829* (2013.01); *B60S 2001/3836* (2013.01); *B60S 2001/3898* (2013.01); *Y10T 428/24802* (2015.01)

(58) Field of Classification Search
USPC ....................................... 428/195.1
See application file for complete search history.

(56) References Cited

U.S. PATENT DOCUMENTS

| 1,851,087 A | * | 3/1932 | Denman ............. 188/251 R |
| 6,077,592 A | | 6/2000 | Azuma et al. |
| 6,696,391 B2 | | 2/2004 | Goto et al. |
| 2003/0022797 A1 | | 1/2003 | Oohira et al. |
| 2005/0074595 A1 | * | 4/2005 | Lam ................. 428/297.4 |

FOREIGN PATENT DOCUMENTS

| DE | 19741225 | 3/1998 |
| DE | 10132026 | 2/2002 |
| JP | 9183867 | 7/1997 |
| JP | 2002146672 A | * 5/2002 |
| JP | 2003253214 | 9/2003 |
| JP | 2006321459 | 11/2006 |

OTHER PUBLICATIONS

Machine Translation of JP 2002146672.*
PCT/EP2009/053857 International Search Report.

* cited by examiner

*Primary Examiner* — Christopher Polley
(74) *Attorney, Agent, or Firm* — Michael Best & Friedrich LLP

(57) ABSTRACT

The invention relates to a wiping rubber for wiper blades in windshield wipers, comprising a profile body formed of an elastomer or rubber material, at least partially having a surface coating. The surface coating (22) comprises carbon fibers (24).

3 Claims, 1 Drawing Sheet

WIPING RUBBER FOR WIPER BLADES IN WINDSHIELD WIPERS

BACKGROUND OF THE INVENTION

The present invention relates to a wiper rubber for wiper blades of windshield wipers, and also to a coating solution and, respectively, a process for production of the wiper rubber, as in the preamble of the independent claims.

Wiper rubber profiles for wiper blades of windshield wipers are subjected to demanding mechanical requirements. By way of example, they have to provide sufficiently good wiping effect on a surface requiring cleaning, while at the same time minimizing generation of noise during the wiping process. These wiper rubber profiles moreover have to have high resistance to environmental effects, a particular example being ozone or UV radiation. In order to comply with these requirements, wiper rubber profiles are generally manufactured from a suitable elastomer material or rubber material and are surface-coated. The effect of the coating is that the coefficient of friction between wiper blade and surface requiring cleaning is reduced during the wiping process and that the wear resistance of the wiping edge, necessary for cleaning of the surface, is improved.

Conventional methods in this connection are chlorination of the wiper rubber profile, and also frequently additional application of a graphite finish. For this, graphite powder is suspended in a suitable organic solvent and sprayed onto the material at least in the region of the wiping lip of the wiper rubber. The organic solvent evaporates and the graphite particles remain finely distributed on the rubber surface and, during a wiping process, reduce the level of friction between elastomer material and surface requiring cleaning.

A disadvantage is that the graphite particles applied often do not have adequate adhesion on the material of the wiper rubber profile, and the premature release of these particles often causes a reduction in the effect of the graphite finish after a short operating time.

In order to counter said problem, DE 101 32 026 A1 describes a coating for wiper blades where a particulate solid lubricant, e.g. graphite, is suspended and applied in a suitable organic binder, e.g. a polyurethane, a polyamide or an epoxy resin. Once the binder has hardened, the graphite particles are bound on the surface of the wiper rubber profile.

SUMMARY OF THE INVENTION

It is an object of the present invention to provide a wiper rubber for wiper blades of windshield wipers where the rubber exhibits a marked improvement in wiping quality under all operating conditions over the required lifetime.

Said object is advantageously achieved via a wiper rubber, also via a coating solution and, respectively, a process for production of the wiper rubber, with the characterizing features of the independent claims.

A particular underlying factor here is that the wiper rubber of the invention encompasses a surface coating which comprises carbon fibers. By virtue of use of a carbon-fiber-containing surface coating, a wiper rubber provided therewith exhibits improved wiping quality and markedly less wear during use, making it possible to omit chlorination of the wiper rubber.

Other advantageous embodiments of the present invention can be found in the dependent claims.

By way of example, it is advantageous if the carbon fibers present in the coating of the wiper rubber have been only partially carbonized. The particular advantage of use of partially carbonized carbon fibers is that these have residual content of functional groups, such as hydroxide groups, amide groups, imide groups, or nitrile groups. These residual functional groups can then react with a binder component of the coating, and the carbon fibers become securely chemically anchored on the surface of the wiper rubber.

It is also advantageous if the length of the carbon fibers is markedly smaller than 1 mm. The particular advantage of use of fibers of said length is that friction and wear of the wiper rubber are sufficiently reduced while the high wiping quality is retained.

In one particularly advantageous embodiment of the present invention, a magnetic field is applied to the wiper rubber during the coating process. If ferro- or paramagnetic carbon fibers are used for the coating, these can be oriented in controlled fashion on the surface. It is particularly advantageous here if the carbon fibers are oriented in essence perpendicularly with respect to the wiper rubber surface requiring coating.

BRIEF DESCRIPTION OF THE DRAWINGS

One embodiment of the present invention is illustrated in the figures and is described in more detail in the description below.

DETAILED DESCRIPTION

Figure 1:
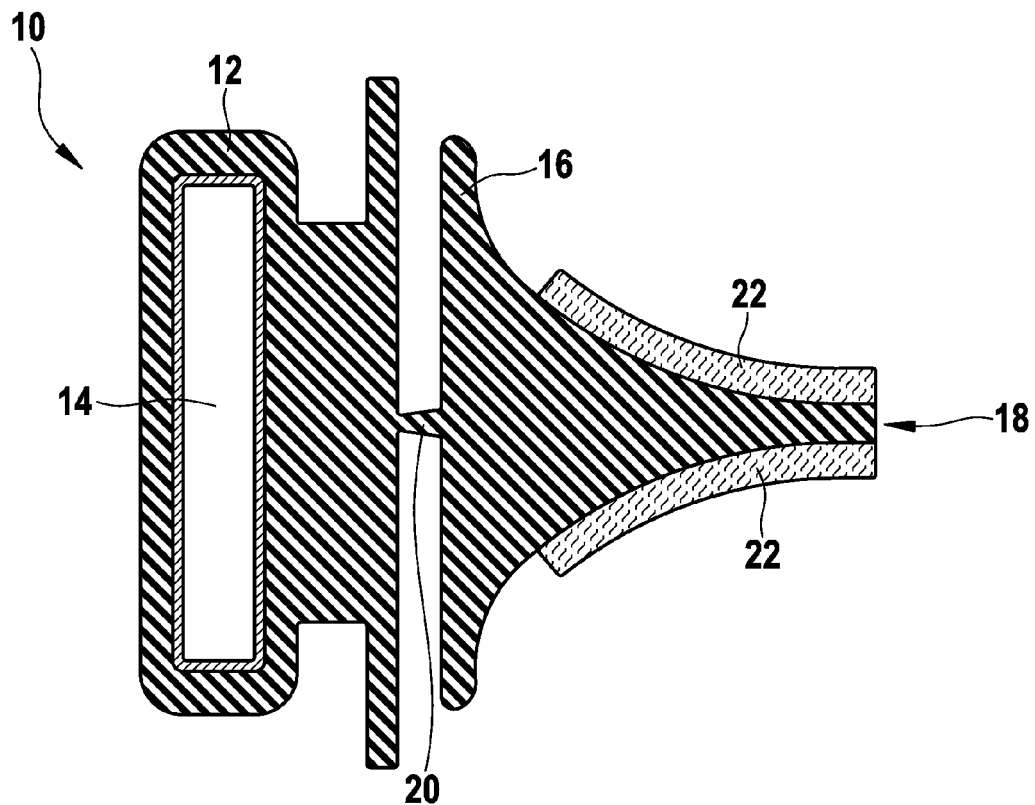
FIG. 1 is a cross-sectional diagram of a wiper rubber in a first embodiment of the present invention.

FIG. 1 depicts a wiper rubber of a wiper blade for windshield wipers in a first embodiment of the present invention. The wiper rubber 10 here encompasses a wiper stock 12, the main function of which consists in the fixing of the wiper rubber to a windshield-wiper-blade holder, not shown. To this end, the wiper rubber 10 has a cavity 14 which is enclosed by rubber material and is oriented in the longitudinal direction of the wiper rubber, and serves for introduction of a wiper-blade holder. The wiper rubber 10 also has a wiper lip 16, the wiper edge 18 of which comes into contact with a surface requiring cleaning. By way of example, there is a tiltable web 20 connecting the wiper stock 12 to the wiper lip 16, where this permits inclination of the wiper lip 16 with respect to the wiper stock 12, as a function of the direction of wiping of the windshield wiper.

By way of example, the wiper rubber 10 has been manufactured from a suitable elastomer or rubber material, examples being natural rubber (NR), polychloroprene (CR), EPDM, isoprene (IR), polybutadiene (BR), styrene-butadiene (SBR), acrylonitrile-butadiene (NBR), mixtures of acrylonitrile-butadiene with PVC, and mixtures of the above-mentioned rubber materials with one another.

In order in particular to allow the mechanical properties of this type of wiper rubber to be influenced advantageously, it preferably has a surface coating 22 at least in the areas which come into contact with a surface requiring cleaning.

By way of example, the surface coating 22 here can merely cover the lateral faces of the wiper lip 16 while omitting the wiper edge 18, as shown in FIG. 1. However, it is also possible to provide a surface coating 22 over the entire wiper lip 16 and, if appropriate, also to apply this coating at least partially on the surface of the tiltable web 20 and/or of the wiper stock 12.

In the invention, the surface coating 22 encompasses, as lubricant, a filler encompassing fibers. The fibers are carbon fibers, preferably only partially carbonized. If the carbonization process is only partial, a certain number of functional groups remain on the surface of the fiber. If the partially carbonized carbon fibers are based on polyacrylonitrile (PAN) or on cellulose or on cellulose derivatives, hydroxide, amide, imide, and/or nitrile groups remain on the surface of the carbon fibers after the partial carbonization process. This permits secure fixing of the carbon fibers on the surface of the wiper rubber material by way of their functional groups, using a reactive resin. The chemical linkage of the partially carbonized carbon fibers to the surface of the wiper rubber 10 markedly increases the wear resistance of the surface coating 22.

The length of the carbon fibers used is preferably by way of example smaller than 1 mm, preferably smaller than 200 µm, and in particular from 3 to 100 µm.

A coating solution is used for the coating of the wiper rubber material, and encompasses carbon fibers and, for example, a resin component as binder. The coating solution is preferably used in the form of a two-component system and to this end preferably comprises a suitable hardener. The proportion of carbon fibers in the coating solution is by way of example from 10 to 70% by weight. The resin component used in the coating solution comprises by way of example a resin based on a cyanate ester which comprises di-, tri-, or oligocyanates.

By way of example, the coating solution is applied to the wiper rubber by means of a transfer roll or by means of dipping or spraying. In the case of the wiper rubber 10 shown in FIG. 1, the coating preferably takes place on both sides of the wiper lip region. To this end, the wiper rubber profile is first extruded or, respectively, injection-molded or compression-molded in the form of a tandem profile with a connection at the wiper edges 18. The coating solution is applied after the wiper rubber profiles have been vulcanized and separated.

Figure 2:
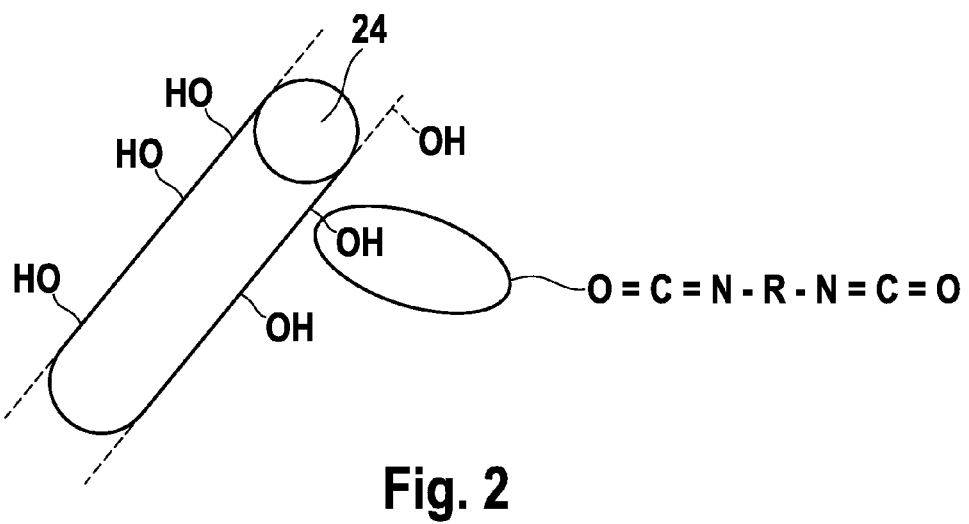
FIG. 2 is a diagram of the chemical reactions proceeding during crosslinking of the surface coating of the wiper rubber.

Once the coating solution has been applied, a drying or crosslinking process takes place, the chemical principles of which are illustrated in FIG. 2. The figure is a diagram of a carbon fiber 24 which has functional groups in the form of hydroxide groups on the surface. In the example shown in FIG. 2, these react with a diisocyanate with elimination of water, thus chemically fixing the fiber 24 to the cyanate-ester-based binder matrix.

In another embodiment, it is possible to render the carbon fibers ferro- or paramagnetic. To this end, these are given a prior, preferably thin, coating of a ferro- or paramagnetic material, for example by means of PVD or CVD. If an electromagnetic field is applied to the wiper rubber during or after the application of the coating solution and in particular prior to the hardening of the same, the concentration of carbon fibers 24 present in the coating solution increases at the surface of the resultant layer 22, and the carbon fibers are usually oriented perpendicularly with respect to the surface of the wiper rubber. This method can achieve a further reduction of the resistance of the surface coating 22 to friction.

Examples are given below of the constitutions of coating solutions, the application of which on a wiper rubber gives a coating that markedly reduces friction.

| | Embodiment | | | |
| --- | --- | --- | --- | --- |
| | 1 | 2 | 3 | 4 |
| Component | Proportion in % by wt. | Proportion in % by wt. | Proportion in % by wt. | Proportion in % by wt. |
| Carbon fibers | 10.0 | 15.0 | 18.0 | 21.0 |
| Polyacrylate | 9.0 | 6.6 | — | — |
| Polyester | — | — | 6.6 | — |
| Melamine hardener | 2.8 | — | — | 10.0 |
| Isocyanate hardener | — | 1.7 | 3.7 | — |
| Thickener (solution) | 2.0 | — | — | 3.0 |
| Butyl glycol | 14.0 | — | — | 14.0 |
| Water (demineralized) | 50.5 | — | — | 52.0 |
| Xylene | — | 22.5 | 22.0 | — |
| Methoxypropyl acetate | — | 22.5 | 22.0 | — |
| N-Butyl acetal | — | 25.7 | 25.9 | — |

The wiper rubber of the invention can advantageously be used in windshield wipers for motor vehicles, rail vehicles, or aircraft, and also for surface cleaning in the context of chemical processes. It is also possible to use it as seal material for door seals or window seals.

What is claimed is:

1. A windshield wiper blade comprising a profile formed from an elastomer material or from a rubber material, where the profile has at least partially a surface coating, characterized in that the surface coating (22) comprises carbon fibers (24), characterized in that the carbon fibers (24) have been partially carbonized but not fully carbonized, and characterized in that the length of the carbon fibers (24) is <1 mm.

2. The wiper blade as claimed in claim 1, characterized in that the carbon fibers (24) are derived from cellulose or PAN.

3. The wiper blade as claimed in claim 1, characterized in that the carbon fibers (24) are ferro- or paramagnetic.

* * * * *